UNITED STATES PATENT OFFICE.

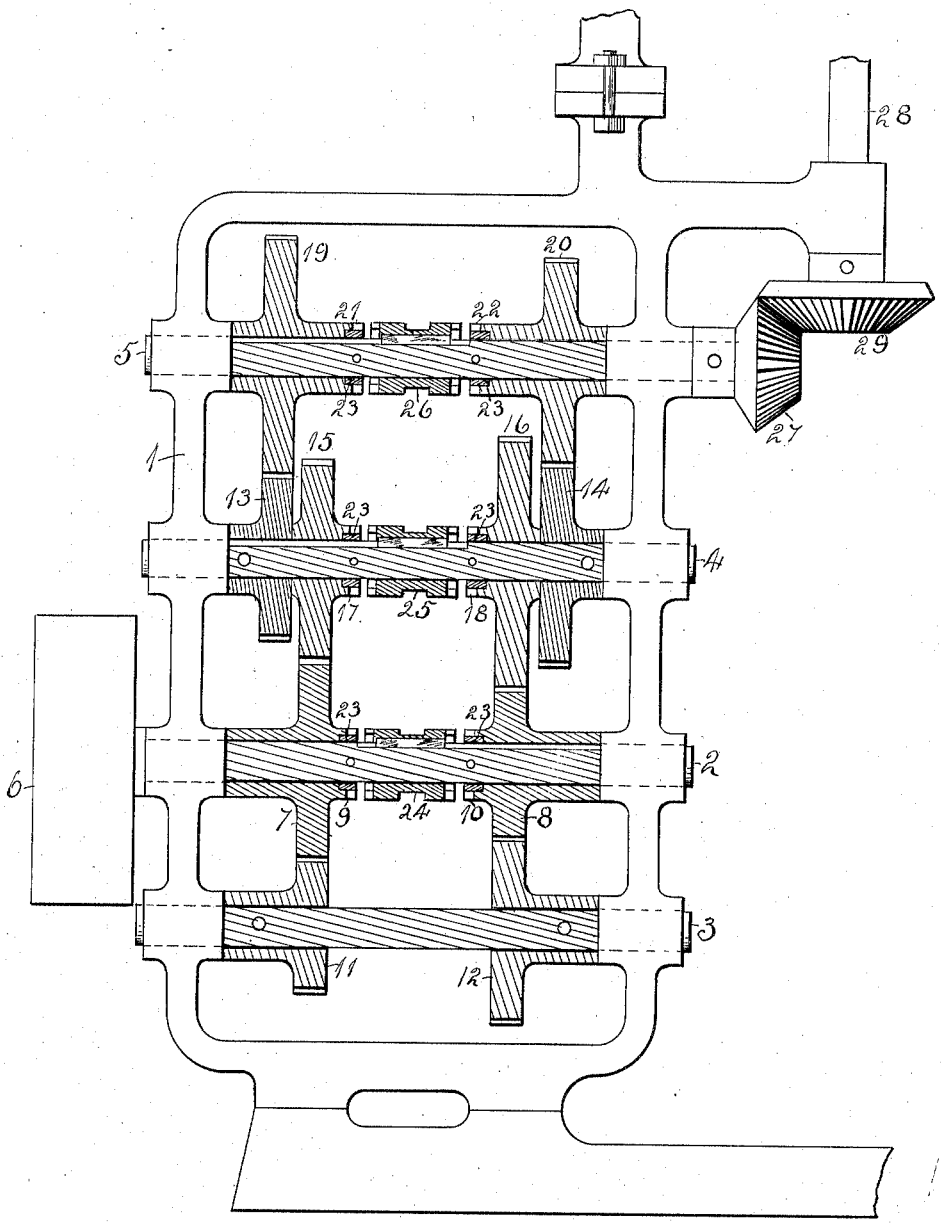

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

SPEED-GEARING.

No. 928,240.   Specification of Letters Patent.   Patented July 20, 1909.

Application filed April 20, 1908. Serial No. 428,128.

*To all whom it may concern:*

Be it known that I, JOHN S. BARNES, a citizen of the United States, residing at Rockford, in the county of Winnebago and State of Illinois, have invented certain new and useful Improvements in Speed-Gearing, of which the following is a specification.

The object of this invention is to construct a variable speed gearing in which variable speeds are imparted to a driven shaft from a constantly rotating shaft.

In the accompanying drawings, I have shown an elevation of the frame, the gearing and some other parts being in section.

The frame 1 is provided with bearings as supports for the four shafts 2, 3, 4 and 5 so as to revolve freely therein. The shaft 2 has a driving pulley 6 connected therewith, and the spur gears 7 and 8 loosely mounted on it and provided with clutch faces 9 and 10 respectively, and the shaft 3 has two spur gears 11 and 12 fixedly connected to it. The shaft 4 has two spur gears 13 and 14 fixedly connected to it and has two spur gears 15 and 16 loosely mounted on it. These spur gears 15 and 16 are provided with clutch faces 17 and 18 respectively. The shaft 5 has two spur gears 19 and 20 loosely mounted on it, and provided with clutch faces 21 and 22 respectively. The loosely mounted spur gears are held in position on their shafts by the collars 23 pinned to the shafts. The shaft 2 has a double clutch section 24 splined to it and is adapted to be moved in engagement with the clutch faces 9 and 10 of the spur gears 7 and 8. The shaft 4 has a double clutch section 25 splined to it and is adapted to be moved in engagement with the clutch faces 17 and 18 of the spur gears 15 and 16. The shaft 5 has a double clutch section 26 splined to it and is adapted to be moved in engagement with the clutch faces 21 and 22 of the spur gears 19 and 20. The shaft 5 has one end projecting beyond the frame and to which is pinned a bevel pinion 27. A shaft 28 is supported by a bearing in the frame 1, and has a bevel gear 29 pinned to it. The bevel pinion 27 and bevel gear 29 are in mesh. The spur gear 7 is in mesh with the spur gears 11 and 15, and the spur gear 8 is in mesh with the spur gears 12 and 16. The spur gears 13 and 19 are in mesh, and the spur gears 14 and 20 are in mesh.

When the double clutch sections are free of engagement with any of the clutch faces of any of the spur gears, the shafts 3, 4 and 5 will remain at rest, and the shaft 2 will be the only one in motion. By moving the double clutch section 24 into engagement with the clutch face of the spur gear 7, the spur gear 7 will be rotated which will rotate the spur gears 11 and 15, and also rotate the spur gears 12, 8 and 16. By moving the double clutch section 25 into engagement with the revolving spur gear 15, the shaft 4 will be rotated which will rotate the spur gears 19 and 20 on the shaft 5. By moving the double clutch section 26 into engagement with first one and then the other of the revolving spur gears 19 and 20, two speeds will be given to the shaft 5 and through the bevel gears to the driven shaft 28. By moving the double clutch section 25 into engagement with the revolving spur gear 16 the shaft 4 will be revolved at a different speed which will revolve the spur gears 19 and 20 at different speeds and through the double clutch section 26 two other speeds will be given to the driven shaft.

By moving the double clutch section 24 into engagement with the face of the spur gear 8, and moving the double clutch section 25 alternately into engagement with the spur gears 15 and 16, and moving the double clutch section 26 alternately into engagement with the spur gears 19 and 20 four more different speeds will be imparted to the driven shaft, making in all eight different speeds that can be imparted to the driven shaft 28 from a given speed imparted to the driving shaft.

The uses to which this speed gearing can be applied are various, and especially in the machinery line.

I claim as my invention:

1. A variable speed gearing comprising a driving shaft, two spur gears loosely mounted on the shaft and each provided with a clutch face, a double clutch section splined to the shaft and adapted to engage the clutch faces of the spur gears, another shaft, two spur gears fixedly connected thereto and meshing with the spur gears on the driving shaft, another shaft, two spur gears loosely mounted on this shaft and each provided with a clutch face, a double clutch section splined to the last mentioned shaft and adapted to engage the clutch faces of said spur gears, the last mentioned spur gears meshing with the spur gears on the driving shaft, a driven shaft, and a driving connection between the last mentioned shaft and the driven shaft.

2. A variable speed gearing comprising a driving shaft, two spur gears loosely mounted on the shaft and each provided with a clutch face, a double clutch section splined to the shaft and adapted to engage the clutch faces of the spur gears, another shaft, two spur gears fixedly connected thereto and meshing with the spur gears on the driving shaft, another shaft, two spur gears loosely mounted on this shaft and each provided with a clutch face, two spur gears fixedly connected with the shaft, a double clutch section splined to the last mentioned shaft and adapted to engage the clutch faces of said spur gears, the last mentioned spur gears meshing with the spur gears on the driving shaft, another shaft, two spur gears loosely mounted on this shaft and each provided with a clutch face, a double clutch section splined to this shaft and adapted to engage the clutch faces of the spur gears, the last mentioned spur gears meshing with the last mentioned fixedly connected spur gears, a driven shaft, and a driving connection between the last mentioned shaft and the driven shaft.

In testimony whereof I have hereunto set my hand in presence of two subscribing witnesses.

JOHN S. BARNES.

Witnesses:
A. J. BARNES,
A. O. BEHEL.